Patented Apr. 6, 1954

2,674,531

UNITED STATES PATENT OFFICE 2,674,531

IRON RECOVERY

Marvin J. Udy, Niagara Falls, N. Y.

No Drawing. Application May 18, 1948,
Serial No. 27,832

2 Claims. (Cl. 75—31)

This invention relates to metallurgy and has for an object the provision of an improved method or process for producing metallic iron. More particularly, the invention contemplates the provision of a method or process which can be employed advantageously and economically to produce high-grade metallic iron products from various grades of iron ore, including the usual commercial ores and some ores of too low-grade to be treated commercially by means of heretofore customary methods or processes. The invention further contemplates the provision of a method or process which can be employed advantageously and economically to produce high-grade metallic iron products from various grades of iron ore through the use of various grades and types of carbonaceous reducing materials, including the usual commercial carbonaceous reducing materials such as high-grade coal and coke and some carbonaceous reducing materials such, for example, as low-grade coal, wood and wood shavings of too poor quality metallurgically to be employed commercially in heretofore customary methods or processes for recovering iron from iron ores.

The invention provides a method or process in which iron is reduced at a relatively low temperature. Many efforts have been made to develop low-temperature processes for producing metallic iron. The most notable among these are the well-known Swedish iron process and the Krupp-Renn process. Efforts have been made, also, to employ the blast furnace in a low-temperature gaseous reduction operation.

None of the efforts made heretofore has resulted in the development of a process which can compete with the blast furnace process for iron production. The production of sponge iron by means of processes of the type of the Swedish process requires the use of iron ore of very high grade, and such processes can not be employed for large tonnage production for reasonable investment and handling costs. The operating temperatures of the Krupp-Renn process are such that refractory costs are very high, particularly when low-grade ores are employed. Attempts at low-temperature reduction in blast furnace operations have failed for many reasons but chiefly because such operations have not been economical.

I have found that the efficiency of iron reduction with solid carbonaceous reducing material can be improved sufficiently through proper fluxing of the gangue materials of iron ores to permit utilization in the production of high-carbon metallic iron of iron ores and solid carbonaceous reducing materials incapable of being utilized effectively commercially in heretofore customary operations and to permit more effective utilization of commercial ores and solid carbonaceous reducing materials in the production of high-carbon metallic iron.

Reduction in accordance with the invention may be carried out at temperatures between about 600° C. and the melting point of the metallic iron produced. Preferably, reduction is carried out at a temperature in the upper portion of the range extending from 600° C. to the melting point of the metallic iron produced. A suitable temperature is one just at or just below the fusing temperature of the slag—a temperature, preferably, at which sufficient softening of the charge undergoing the reduction treatment to produce a sintered product takes place. Adjustment of the proportions of slag-forming materials present in the charge may be carried out advantageously to provide for effective reduction at temperatures about in the range 1100° C. to 1200° C.

A complete process of the invention comprises two or more steps, depending on the composition of the ore treated, including a preliminary low-temperature reduction step and a melting step. When iron is the only metallic element present in the ore, or, when a single metallic product comprising the iron of the ore alone or comprising the iron and any other metallic element present in the ore is sought, the process of the invention for the production of a metallic iron-bearing product may consist of a low-temperature reduction step for the production of a hot or relatively high-temperature sintered product comprising reduced metallic iron and a melting step designed to receive and treat the hot sintered product for the production of a molten bath comprising separable layers of molten metal and molten slag. The melting step may be carried out in any suitable type of melting furnace such, for example, as an electric furnace of any kind, an open hearth furnace, an air furnace or a reverberatory type of furnace fired by coal, gas or oil.

When a process of the invention is employed for the treatment of an iron ore containing one or more of the non-ferrous metals, nickel, cobalt, and copper, melting may be carried out in two stages in the first of which, a molten metallic product containing a large proportion or substantially all of the one or more non-ferrous metals and a small amount of the iron is produced and in the second of which a molten metallic product containing the remainder of the reduced metallic iron is produced. When a process of the invention is employed for the treatment of a high-phosphorus iron ore, a procedure similar to that employed in separating non-ferrous metals may be employed to produce a metallic product comprising some iron and high in phosphorus in a first or preliminary melting stage and a product comprising the remainder of the iron in a second or principal melting stage.

For fluxing ore to be treated and producing a suitable reduction charge in accordance with the invention, I incorporate in the charge iron ore, solid carbonaceous material and fluxing material such as lime and silica, as required, to flux the gangue of the ore and the ash-forming constituents or components of the carbonaceous material. The components of the charge are selected to provide for the production of a slag having a lime-silica molecular ratio in the range, 0.7 to 3.0 molecules of CaO to 1.0 molecule of $SiO_2$. Any suitable lime-silica ratio may be employed in any modification of the process of my invention, but I prefer to employ ratios in the range of about 0.7 to 1.5 CaO to 1.0 $SiO_2$ when combustion-heated furnaces are employed for melting the sintered products of the reducing treatments, and I prefer to employ ratios in the range of about 1.5 to 3.0 CaO to 1.0 $SiO_2$ when electric furnaces are employed for melting the sintered products of the reducing treatments. In general, if the electric furnace is used for melting, the higher ratios of CaO to $SiO_2$ may be useful, depending on whether a finished steel or a pig iron end product is desired.

I may incorporate in the charge to be subjected to the reducing and sintering treatment all or any desired portion of the total amount of solid carbonaceous material required and I may so control the reducing and sintering treatments, with respect to times, temperatures and additions of fluxing materials, as to effect reduction of iron by means of all or any desired proportion of the carbonaceous material. When an amount of solid carbonaceous material less than the amount required to effect complete reduction is employed, additional solid carbonaceous reducing material may be added to the charge employed in a subsequent melting operation. When the reducing and sintering treatment is so controlled as to effect reduction by means of only a portion of the solid carbonaceous material, further reduction will be effected in the melting stage following the reduction and sintering treatment. In a preferred process of the invention, I incorporate in the charge to be subjected to the reducing and sintering treatment solid carbonaceous reducing material in amount sufficient to reduce all of the iron of the iron ore of the charge, and I so conduct the reducing and sintering treatment as to effect reduction of a large proportion of the iron, complete reduction not being highly essential since further reduction will take place in the following melting step.

In forming a charge in accordance with the invention, I prefer to mix intimately the various components including the ore, solid carbonaceous material, and fluxing material. The components may be crushed to any suitable degrees of fineness and any suitable mixing methods and apparatus may be employed. For most effective mixing, I prefer to grind together in a suitable mill the various components of the charge. A charge in which all of the materials are finely divided and a large proportion of the particles are small enough to pass a 10-mesh screen permits effective sintering and reduction. Products comprising smaller particles permit more intimate contact of components and provide for more rapid sintering and reduction.

Sintering preferably is carried out at a temperature such that the lime employed for fluxing purposes may enter into chemical combination with silica present in the charge. The lime thus is placed in position to function most effectively as a fluxing agent during the reduction and melting treatments. The sintering treatment may also result in the production of calcium compounds of iron which are more readily reducible than the compounds of iron contained in the original iron ore.

The reducing and sintering treatment accomplishes a substantial amount of the total work required to be done to recover metallic iron from iron ore. Thus, for example, a large proportion of the iron may be reduced, slag-forming materials are placed in positions where they may function with high efficiencies to form molten slag products in the subsequent melting treatment, solid carbonaceous material is placed in position and condition to function effectively in the subsequent melting treatment when only partial reduction of iron is accomplished in the reducing and sintering operation, and there is delivered to the melting furnace a hot sintered product (having a temperature at or near the sintering temperature) which can be raised rapidly to and through the slag and metal melting temperatures to accomplish effectively completion of the work of reducing, melting and separation of slag and metal products remaining to be done to produce the useful metal.

Any suitable type of furnace may be employed for carrying out the reducing and sintering treatment. I prefer to employ a rotary kiln of the type of a cement kiln or a traveling hearth type sintering furnace, such, for example, as the Dwight-Lloyd sintering furnace or a tunnel kiln.

In a preferred process, I employ a rotary kiln and carry out the reducing and sintering treatment at a temperature of about 1100° C. or higher. The hot completely or partially sintered charge is discharged from the kiln directly into an electric or other suitable type of furnace, and the temperature is raised rapidly to and through the melting temperatures of the metallic iron and the slag. Charge material is delivered continuously to the sintering and reducing kiln, and the hot sintered product is delivered continuously to the melting furnace wherein melting takes place rapidly. Molten pig iron and molten slag are tapped from the melting furnace intermittently. The pig iron is cast in suitable molds, and the slag is granulated or treated otherwise for disposal.

If a type of metal product other than pig iron is desired such, for example, as plain carbon steel, I tap off the slag and then refine the iron with iron ore in the usual manner to remove the carbon to any desired point and produce a finished steel. I may make alloy steel by adding the proper amounts of alloys as in the usual steel practice.

I may control the carbon in the iron in the reduction in the kiln by the amount of carbon used in the charge, I may make only a partial reduction (30% to 80%, for example) in the kiln and finish the reduction in the melting furnace. Between the kiln and the melting furnace, there is ample opportunity for control available to operate as the economy dictates as to carbon content of the finished products.

When operated efficiently for the recovery of iron alone, my process becomes a two stage process in which the reduction and slag formation stage is carried out in a low-temperature range to produce a partially or wholly sintered and partially or wholly reduced product and the melting and refining stage is carried out in a high-temperature range in high-temperature equipment to produce molten slag and a molten iron product of any desired composition.

The process of my invention may be operated advantageously to utilize high-phosphorus ores by using two electric melting furnaces. In the first furnace, a partially reduced sinter containing iron oxide and some metallic iron is melted to produce a small amount of iron high in phosphorus. The slag from this furnace is tapped into a second furnace and the reduction of the iron oxide completed with coke or coal to produce low phosphorus pig iron or steel as the case may be. The high-phosphorus iron is tapped from the first furnace and cast into pigs. The operation may be carried out in the same furnace, if desired, by tapping out the high-phosphorus iron first and then completing the reduction of the balance of the iron oxide in the slag to produce low-phosphorus iron or steel.

The process of the invention, unlike other processes, is capable of high-tonnage production. A rotary kiln of 180 feet length and 8 feet diameter, can be used to produce at least 240 tons and as much as 500 tons or more of iron per day. This kiln can be used to feed one or more melting furnaces. It can also be used to heat scrap iron and steel. That is, fine scrap, such as short turnings or shredded turnings, may be added to the charge and be preheated before entering the melting furnace. Large scrap may be added into the melting furnace directly.

Larger kilns, the 500 to 700 foot length, would, of course, come up to production equalling the blast furnace. Such kilns would require several melting furnaces of normal size.

Many attempts have been made to accomplish electric furnace smelting of pig iron, but they have not been economical compared to the blast furnace. In my process, the electric furnace is economical even at the high cost of power in the steel centers of the United States, because the amount of power required is reduced substantially merely to that required for refining, which, in good practice, may be as low as 700 kilowatt hours per ton.

My process further makes possible the operation of larger electric furnaces. The usual electric steel furnace, operating on scrap, operates at a low power factor because of the large amount of inductance required to make the operation smooth. This low power factor is a heavy load on the power generating facilities. In my process, the melting furnace can readily be designed to operate at 95% power factor and thereby increase the efficiency of melting and reduce the burden on the power generating facilities. The process will make more power available through the more efficient use of the present capacity. This is true because the melting takes place at all times under a fairly heavy slag. Molten slag is tapped off at about the same rate at which it is produced, after formation of a suitable fluid slag covering for the metal, so that there is maintained at all times a sufficiently heavy slag layer to provide for efficient melting and for carrying the power into the furnace at high efficiency.

It is not necessary to use electric power. The melting may be done in the open hearth furnace for the ordinary types of steels. For the alloy steels, particularly the high alloy steels, the electric furnace should be used as the melting furnace.

My process is of great value to the steel shop which does not have blast furnaces to supply hot metal. Through the use of a rotary kiln and an electric furnace or an open hearth furnace in accordance with my process, hot metal can be supplied to the steel furnaces of such shops at a reasonable capital investment, and at a cost per ton of hot iron of the same order as the cost of blast furnace iron. Furthermore, the carbon can be better controlled and kept below that of blast furnace iron, thereby increasing the capacity of the open hearth or electric steel making furnaces. My process when operated by such shops, would employ the melting furnace simply as a holding furnace. The hot metal being taken from the furnace by ladle to the regular open hearth or steel making furnaces as needed.

My process makes it possible to use lower grade ores and ores such as concentrates and fines that are physically unsuitable for use in other methods. It also makes possible the production of pig iron and steel on a large scale without the use of coke. Low grade fuels are usable. It is particularly suitable for use in such parts of the United States as the Pacific Northwest, and California and in Brazil and other countries of the world where good coking coals are not available. It is a process that can use the great slag dumps from the copper and lead and nickel smelters, in the interest of conservation of resources to make pig iron. Fine ores and concentrates must be sintered for the blast furnace without otherwise advancing their condition. My process uses fine ores to advantage.

I claim:

1. The method of recovering a low-phosphorus metallic iron-bearing product from phosphorus-bearing iron oxide ore which comprises forming a charge comprising the ore, fluxing material and solid carbonaceous reducing material in amount sufficient to reduce all of the phosphorus and a portion only of the iron of the ore, heating the charge to a temperature in the range 1100° C. to 1200° C. and forming a high-temperature sintered product comprising slag and reduced metallic iron containing reduced phosphorus, heating the high-temperature sintered product to melt the slag and metallic iron contained therein and forming molten slag containing unreduced iron oxide and molten metallic iron high in phosphorus, separating the molten slag and molten iron, subjecting the molten slag to a further heat treatment at a temperature above the melting temperature of he slag in the presence of added solid carbonaceous reducing material in amount sufficient to reduce the remainder of the iron of the iron oxide contained in the molten slag and thereby reducing an additional quantity of iron of the iron oxide and forming molten slag and molten low-phosphorus metallic iron, and separating the molten slag and the molten low-phosphorus metallic iron.

2. The method of recovering a low-phosphorus metallic iron-bearing product from phosphorus-bearing iron oxide ore which comprises forming a charge comprising the ore, fluxing material and solid carbonaceous reducing material in amount sufficient to reduce all of the phosphorus and a portion only of the iron of the ore, heating the charge to a temperature between 600° C. and the melting point of the metallic iron produced and forming a high-temperature sintered product comprising slag and reduced metallic iron containing reduced phosphorus, heating the high-temperature sintered product to melt the slag and metallic iron contained therein and forming molten slag containing unreduced iron oxide and molten metallic iron high in phosphorus, separating the molten slag and the molten iron, subjecting the molten slag to a further heat treatment at a temperature above the melting temperature of the slag in the presence of added solid carbonaceous reducing material in amount sufficient to reduce the remainder of the iron of the iron oxide contained in the molten slag and thereby reducing an additional quantity of iron of the iron oxide and forming molten slag and molten low-phosphorus metallic iron, and separating the molten slag and the molten low-phosphorus metallic iron.

References Cited in the file of this patent

UNITED STATES PATENTS

| Number | Name | Date |
|---|---|---|
| 93,758 | Siemens | Aug. 17, 1869 |
| 809,291 | Fleischer | Jan. 9, 1906 |
| 875,852 | Savelsberg | Jan. 7, 1908 |
| 1,028,070 | Hiorth | May 28, 1912 |
| 1,169,139 | Dwight | Jan. 25, 1916 |
| 1,254,316 | Dwight | Jan. 22, 1918 |
| 1,264,237 | Webster | Apr. 30, 1918 |
| 1,346,187 | Fahrenwald | July 13, 1920 |
| 1,523,044 | Den Brock et al. | Jan. 13, 1925 |
| 1,565,689 | Van Slyke | Dec. 15, 1925 |
| 1,717,160 | Kichline | June 11, 1929 |
| 1,720,055 | Peyrachon | July 9, 1929 |
| 1,796,871 | Madorsky | Mar. 17, 1931 |
| 1,847,596 | Cavers | Mar. 1, 1932 |
| 1,871,848 | Gustafsson | Aug. 16, 1932 |
| 1,892,740 | Smith | Jan. 3, 1933 |
| 1,944,874 | Brassert | Jan. 30, 1934 |
| 2,028,105 | Head | Jan. 14, 1936 |
| 2,035,550 | Karwat | Mar. 31, 1936 |
| 2,230,322 | Flannery | Feb. 4, 1941 |
| 2,243,785 | Udy | May 27, 1941 |
| 2,313,044 | Brassert | Mar. 9, 1943 |
| 2,395,029 | Baily | Feb. 19, 1946 |